(12) United States Patent
Scherzer (10) Patent No.: US 7,562,050 B2
(45) Date of Patent: Jul. 14, 2009

(54) AGING OF ELECTRONIC PAYMENT UNITS

(75) Inventor: Helmut Scherzer, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1480 days.

(21) Appl. No.: 09/997,543

(22) Filed: Nov. 29, 2001

(65) Prior Publication Data

US 2002/0038288 A1 Mar. 28, 2002

(30) Foreign Application Priority Data

Sep. 12, 2000 (EP) ................... 00127046

(51) Int. Cl.
*G06Q 40/00* (2006.01)

(52) U.S. Cl. ..................................... 705/41

(58) Field of Classification Search .............. 705/44, 705/65, 41; 380/24; 235/382.5, 492
See application file for complete search history.

(56) References Cited

U.S. PATENT DOCUMENTS

| | | | | |
|---|---|---|---|---|
| 4,992,646 A | * | 2/1991 | Collin | 235/375 |
| 5,440,634 A | * | 8/1995 | Jones et al. | 705/67 |
| 5,534,683 A | * | 7/1996 | Rankl et al. | 235/380 |
| 5,949,880 A | * | 9/1999 | Curry et al. | 705/66 |
| 5,987,438 A | * | 11/1999 | Nakano et al. | 705/41 |
| 5,988,497 A | * | 11/1999 | Wallace | 235/382.5 |
| 5,999,625 A | * | 12/1999 | Bellare et al. | 705/64 |
| 6,076,075 A | * | 6/2000 | Teicher | 705/41 |
| 6,119,946 A | | 9/2000 | Teicher | |
| 6,266,653 B1 | * | 7/2001 | Shiobara et al. | 705/41 |
| 6,345,263 B1 | * | 2/2002 | Matsumoto et al. | 705/41 |
| 6,431,454 B1 | * | 8/2002 | Hjelmvik | 235/492 |
| 6,575,361 B1 | * | 6/2003 | Graves et al. | 235/380 |
| 6,615,193 B1 | * | 9/2003 | Kingdon et al. | 705/65 |
| 6,711,685 B1 | * | 3/2004 | Schaal et al. | 726/31 |

FOREIGN PATENT DOCUMENTS

WO EP 1072997 A1 * 1/1999

* cited by examiner

*Primary Examiner*—Hani Kazimi
*Assistant Examiner*—Bijendra K Shrestha
(74) *Attorney, Agent, or Firm*—Scully, Scott, Murphy & Presser, P.C.; Lisa M. Yamonaco (57) ABSTRACT

The present invention relates to an electronic purse data carrier for performing monetary transactions and a method for managing electronic payments with such a carrier. The purse stores one or more payment units each having a respective monetary value, whereby each of said payment units has a respective unique payment unit-ID and comprises an age information evaluable for delimiting the use of it. In particular said information defines a dynamically changing age level. This can be used to force purse owners to return each electronic monetary unit back to the issuing party after a specified cycle measured in time or transactions has passed in order to validate the authenticy, and in particular in order to test for possibly duplicated monetary units.

9 Claims, 4 Drawing Sheets

| 10 | 12 | 14 | 16 | 18 | 20 |
|---|---|---|---|---|---|
| PU-ID | PU-VALUE | CYCLE-# | TRANS.-COUNT | CH.PU-ID | VALID |

AGING OF ELECTRONIC PAYMENT UNITS

1. BACKGROUND OF THE INVENTION

1.1 Field of the Invention

The present invention relates to an electronic purse data carrier for performing monetary transactions and a method for managing electronic payments with such a carrier.

1.2 Description and Disadvantages of Prior Art

Electronic payment with so-called electronic purse applications and systems is considered likely to become more and more important for today's business processes, all over in the world. The multiple different prior art electronic purse applications are based on the same principle: they store electronic values representing so-called payment units for the purpose of financial transactions in a secure environment. These units are most often stored securely in chipcards to avoid undesired attacks. This protection is typically realized by applying cryptographic methods and secret keys which deny access to the security-relevant storage locations of a chipcard, and in particular, to the electronic monetary values. Examples are the EC-cards, and credit cards.

In view of the constraint to keep the total amount of active money in the system constant and controllable by state authorities it is necessary to avoid the existence of illegal copies of electronic monetary units. This is one of the key problems encountered with electronic payment.

Different approaches to solve this problem are known in prior art. An electronic purse system may encrypt all data while they are transmitted between interface devices being part of a monetary transaction. Any attempt to make an illegal copy of electronic payment units is fought against by storing the monetary units in tamper-resistant interface devices and by accessing them only from within a secure session. Wiretapping the I/O line of a device is useless as the tapped information cannot be decoded.

The above encryption methods are of particular interest in applications of anonymous electronic money traffic. Such a system, for example, like the German 'Geldkarte' allows anonymous payment only for certain dedicated services. Purse-to-purse transactions with any desired person's purse is not possible. When being anonymous, the usage of any electronic monetary unit cannot be traced or be predicted. Any payment unit, abbreviated herein also as PU, being identified by a unique identification characteristic, can be exchanged between various customers and thereby multiplied, while the issuing party, i.e., a state-controlled banking authority, is not able to control or trace the current location or the current owner of it. Thus, the money traffic is not clear and transparent for the authorities. Any large-scale misuse of electronic payment units may have serious consequences for the macroeconomics of a country, for example in terms of inflationary influences of such misuse.

Furthermore, this approach does not provide any means to return a monetary unit back to the issuing authority, if ever required.

Another method to protect the duplication of electronic monetary units is to uniquely label them in a non-anonymous purse. Here, the distributed payment units have a well-defined life cycle:

First, the issuing authority loads an electronic purse with monetary units. Then the customer may pay these units to a retailer or to any service provider when buying something. The retailer or service provider then returns the units to the issuing party to exchange the electronic 'debits' into an update of its real bank account. As the issuing party can identify the monetary unit, it also can trace the life of the unit which makes the transaction "non-anonymous". The retailer or service provider cannot re-use the electronic payment unit once received. Inasmuch as such payment units are varying continously in value because they always correspond to the exact price of a respective service, or product, for example 322.65 EUR, a re-use is not desired.

This mechanism allows the issuing party a satisfactory proof of the authenticy of the electronic payment unit. Furthermore, the identification of the delivered payment units are stored, a duplicate payment request from a service provider therefore may be identified and can be traced. The customer, however, might not appreciate the non-anonymous approach as this method has always a strong impact to his privacy.

The usage of anonymous payment units, however, is of particular interest to the customer, in particular because his privacy is kept and a more flexible usage is enabled with it, for example by enabling for purse-to-purse transactions.

The increase in privacy, however, is a decrease in security and controllability from the perspective of the issuing party, as in the prior art no control can be gained over the large number of issued electronic payment units. This may lead to legal consequences as it is stated by law in some countries to keep the total amount of money supervised by an auditing party.

While there are sufficient means available with physical monetary bills through physical features, a proof of authenticy is practically not possible with electronic monetary units.

Further, a problem has been experienced in particular by the purse owner, when an electronic purse data carrier, like a chipcard, for example, which is loaded with some electronic payment units representing a definite monetary value, is destroyed. As a copy of payment units is not desired as has been described above, the electronic payment units of an anonymous purse typically reside at one location only at a time. If, accidentally, the carrier of these units should be destroyed there will be a definitive loss of the monetary value stored electronically on the carrier. This is a further significant obstacle for loading large amounts of electronic payment units to an anonymous electronic purse.

1.3 Objects of the Invention

It is thus an objective of the present invention to provide for a more flexible and secure money traffic, both, for the individual purse owner and the state, while keeping the traffic private.

2. SUMMARY AND ADVANTAGES OF THE INVENTION

These objects of the invention are achieved by the features stated in the attached independent claims. Further advantageous arrangements and embodiments of the invention are set forth in the respective dependent claims.

The present invention is based on the idea of generating a means which forces the return of each electronic monetary unit back to the issuing party after a specified cycle measured in time or transactions, in order to validate the authenticity and in particular in order to test for possibly duplicated monetary units.

According to its basic aspect the present invention provides for an electronic purse data carrier for performing monetary transactions which comprises a storage means for storing one or more payment units each having a respective monetary value, whereby each of said payment units comprises age information defining a dynamic age level, and each of said payment units has a respective unique payment unit-ID.

The term 'dymnamic age level' is to be understood to represent any kind of information the evaluation of which discloses the dynamically changing extent of actual transactional or potential use, respectively, of a respective payment unit. Said evaluation may thus yield an answer to a type of questions like 'how often has the respective payment unit been involved in a transaction?', or 'how much time has passed between the official issue of the payment unit until now?'. In general, said dynamic age level should be useful to define a parameter which changes over time or according to the extent of use of the payment unit. For example, it can be represented by a steadily increasing or decreasing function, i.e., having a monotone behavior which can be compared to one or more threshold levels in order to generate a criterion for at least influencing and optionally delimiting the repetitive transactional use of a payment unit in the statistically regular case and therewith forcing the owner of such an 'expired' payment unit to go to a bank to get them reset. This reset process can then be used via the unique PU-ID for the desired official control.

A key idea of the present invention is thus introducing the approach of 'aging of electronic monetary units'. Besides the unique identification, a monetary unit comprises 'age-telling' information, for example a counter reflecting the 'age' or the number of transactions it has seen since it was issued.

On each payment transaction of a particular unit its counter is changed such that its usage is limited by a predetermined maximum number of transactions defined by the issuer of the monetary unit.

The owner of the monetary unit experiencing the 'maximum-overflow' case may be informed about the 'expired age' of his units by appropriate means, for example by commands implemented in the program of the carrier chipcard. If some or all units are found due, the user should visit the issuing company or its representative to have the units revalidated in the above mentioned reset procedure. This may be realized by resetting the appropriate counters of some or all of the presented monetary units. The issuer, however, is able to verify the electronic units by this process. He can store any relevant data needed for controlling and security purposes.

If subsequent to said reset any duplicated, i.e., illegally copied monetary unit is presented to the card issuer for account balance purposes, the issuing party may authenticate the monetary unit by comparing the active cycle counter or other security relevant information in the payment unit. The advantage of an anonymous usage of a payment unit is kept guaranteed, the issuing party, however, may detect duplicated electronic payment units and control the total amount of issued monetary units.

Even in case of a successful illegal copy of an electronic payment unit its useability is limited by the validation counter (age) thus the possible miss-use can be kept under at least some control.

In particular, the option of traceability is not excluded by the inventive concepts presented here: According to a further aspect of the invention, under particular, well-defined conditions the receiver of a monetary unit might log an identification token belonging to the payer. Although this decreases the anonymity significantly, this particular feature allows some limited traceablity for rare exceptional cases when a chain of personal Ids is stored with a payment unit.

The inventive payment units are secured by cryptogrpaphical methods such, that its security-relevant features can be accessed and modified only through authorized agencies. In particular, the public-key technology is a powerful concept as the payment-relevant data may be verified through public keys. The time-variant information, e.g., the above mentioned validation counter, must be changed on each transaction while this change must take place in a secure environment. The appropriate keys for reading and updating the validation counter must be available or retrievable in each interface device used for the execution of a purse transaction.

One possibility introduces the n-times application of a secrect key on a target number x, the result may be represented through xnxSK. This number represents the validation counter, i.e., the age information of the payment unit. The target number x is available in clear additionally in the payment unit. On each payment transaction the appropriate public key is applied to the payment unit. Backstepping is impossible as the required secret key for such a step is not available. After n repetitive applications of the public key to the secret key the target number will have been reached and the payment unit can for example be blocked for later usage until evaluated by the issuing party.

The usage of a validation counter keeps an essential advantage for the issuing company: The identification of a payment unit does not have to be changed after it has been returned to the issuing party. The issuer may store the identification and its present validation counter. Each balance request with an incompatible value of the validation counter may be detected and inhibited. An advantageous embodiment of the validation mechanism can include a threshold definition mod N, another, however, involves a second validation counter which counts or reflects the number of transactions over the whole life of the payment unit.

A second inventive aspect focusses on the problem of possible destruction of the chipcard carrier containing the storage image of the monetary units. It proposes a method to download representative parameters for the stored payment unit into a backup device. These parameters may be stored in encrypted form as well as in plain text, whereby in the latter case only the identification parameters may be communicated, finally protected, e.g., by a cryptographic checksum.

The user of the carrier may then transfer these representative parameters of the monetary units into a backup system by a special command issued to the chipcard program. When successful and confirmed by the chipcard program the appropriate monetary units will be considered as 'backed up successfully'.

In case the chipcard is destroyed, the user may present the above parameters to the issue authority for a refund.

Even in a fraudulent scenario in which the user first stores an image of a 'full' card, then buys something with the card and destroys the 'empty' card and later is refunded—can be detected because each of the stored units will come back to the issuing party after its validation counter has expired. Each unit which has been returned to the issuer, can then be disclaimed from the customer and can be reembursed to the issuer.

As time goes by the probability increases that a payment unit is brought back to the issuer.

Said 'fraud', however, can also happen incidentally, if the time between the last backup and card destruction is large and the card has not been destroyed intentionally. Therefore said situation does not necessarily indicate a fraudulent intention of the complaining customer. Said scenario may also be used by a third party offering assurance services and the backup facility as an additional service.

In order to intensify the 'bring-back-to-issuer' obligation said age data can advantageously be updated along with the passing of real time. For example, the initial issue date can be stored and compared with the current date. If there is a time span greater than 2 years an automatic expiration can be provided coupled to or independent of other age information present in the payment unit.

According to a further aspect of the present invention payment units may be split and joined.

The inventive method for managing electronic payments can be implemented in program form into a chipcard or other communication devices, like a trading transaction device, banking terminal, etc., whereby said splitting procedure basically comprises the following steps:

splitting a parent payment unit having a given non-minimum parent monetary value into a plurality of children payment units each having a child monetary value smaller than the parent value, the sum of children monetary values being the same as the parent monetary value, and, optionally, transferring a respective age information from said parent unit to the plurality of children payment units.

The joining procedure then comprises the steps of joining a plurality of single payment units having a given total monetary value into a joined payment unit having a corresponding same monetary value, and generating a resulting age information for said joined payment unit according to a predetermined rule. Advantageously, the oldest age information is inherited to the joined payment unit. Optionally, payment units having a monetary value smaller than a given change threshold age level can be excluded from inheriting their age information in order to increase user comfort.

By said optional aspects of splitting and joining payment units the comfort of daily use of said purses is remarkably increased because purses can perform trading transactions which are not provided with enough small value payment units to change the money adapted to a current product price having a very uneven size, such as for example 19.67 EUR.

A further advantageous feature can be provided: In a situation in which storage space is present only to a small extent on the carrier chip a patching pattern for splitting and/or joining generates payment units having individual sizes according to storage requirements present on the carrier. For example, three 1-EUR payment units and forty-eight 1-Cent units are joined to a single payment unit of 3.48 EUR.

3. BRIEF DESCRIPTION OF THE DRAWINGS

The present invention is illustrated by way of example and is not limited by the shape of the figures of the accompanying drawings in which.

4. DESCRIPTION OF THE PREFERRED EMBODIMENT

Figure 1:
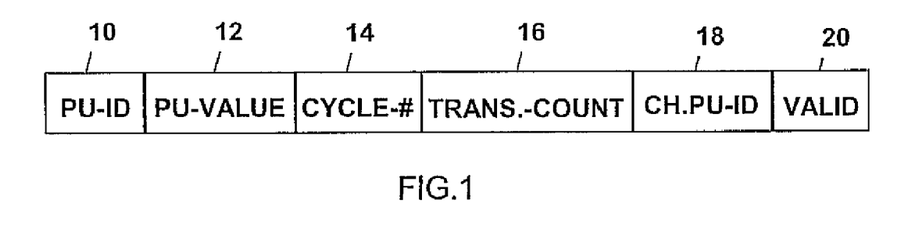
FIG. 1 a schematic representation of the storage field of a payment unit according to a specific embodiment thereof.
Figure 2:
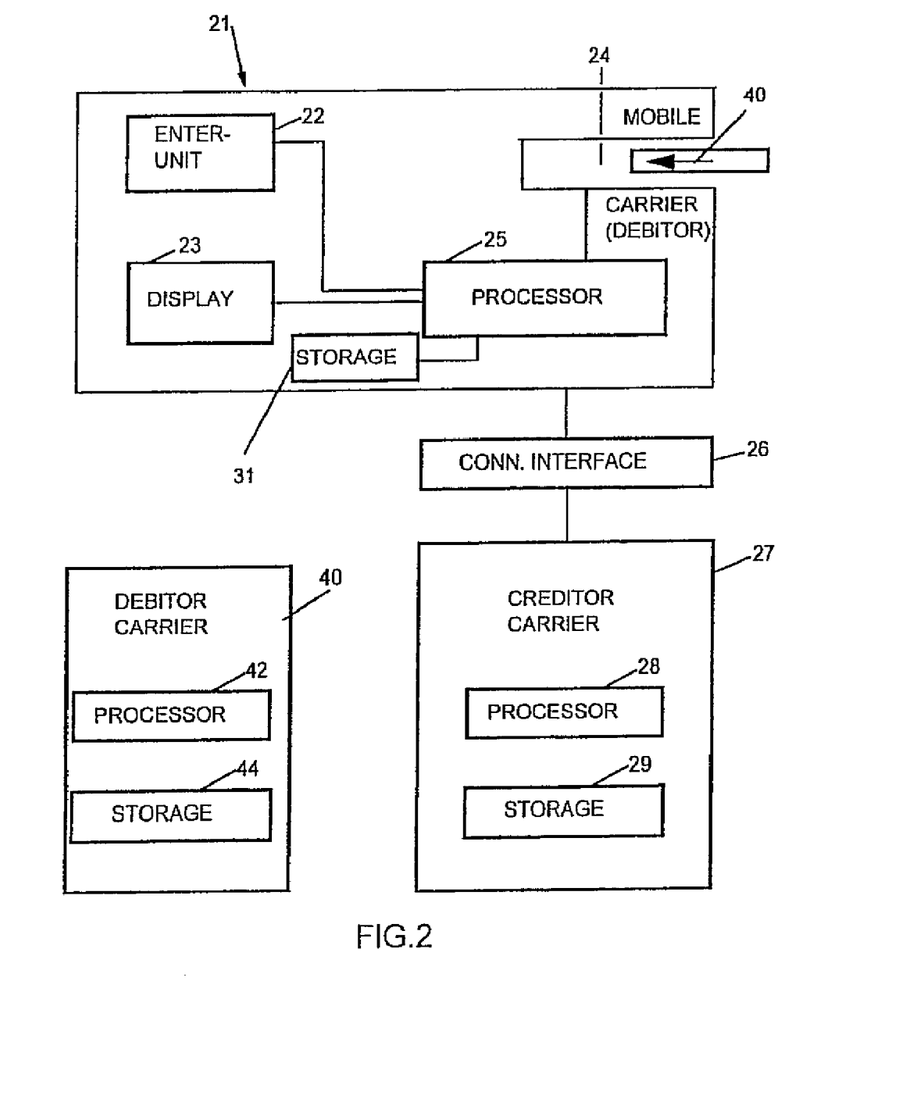
FIG. 2 is a schematic representation of carrier devices and a trading transaction device and their respective internal structure usable for performing a trading transaction, FIGS. 3A, B, C is a schematic representation of basic steps and the control flow performed during a monetary transaction.

With general reference to the figures and with special reference now to FIG. 2 an inventive electronic purse data carrier 40 is a SmartCard having a processor 42 and a storage area 44. In said storage area a predetermined number of storage locations is provided for a respective number of datasets, one of which is depicted schematically in FIG. 1.

Each dataset is associated with, i.e., represents a payment unit. As shown in FIG. 1 each dataset comprises a payment unit ID which uniquely identifies the payment unit in spite of a large number of payment units being circulated, for example in one country or one geographic region. The payment units can be defined, issued and managed by an official bank institution of a respective governmental authority.

Each payment unit thus comprises an ID-field 10 which can be filled with an ID-code of for example a length of 64 bits. In a next field 12 the monetary value of the payment unit is stored. For a payment unit of 20 Euro, for example, the digital representation of the number 20 can be stored together with an optionally provided currency ID.

In field 14 a cycle number is provided. The cycle number is initiated with 'zero' when the payment unit is first issued by the official bank authority. Later in its life it will be increased by said authority in a reset process: see further below for details.

In field 16 a transaction count is stored. This field is again initialized to 'zero' and will be increased by one each time the payment unit identified by the particular PU-ID forms part of a transaction. Details about how to perform such a transaction will be given later below.

In field 18 a change PU-ID is provided. This field serves to store the PU-ID of a parent payment unit which was subjected to an inventional splitting process from which the actual payment unit just described was generated. Details about how to split a payment unit into a plurality of children payment units and details concerning the contrary case of joining a plurality of single payment units into a joint payment unit follow later below.

Finally, a valid-field 20 is provided in order to store if the respective payment unit is valid, or not, i.e., if the payment unit represents some money ready to spend, or, otherwise in order to characterize the respective payment unit as having been spent already.

All fields are subjected to prior art encryption methods when stored as well as during any kind of transaction during which one or more payment units serve to buy something.

With special reference now to FIG. 2 an inventive trading transaction device 21, an inventive mobile electronic purse data carrier 40 as well as an inventive stationary purse data carrier 27 will be described below in view of their respective functional aspects and internal structure.

The ensemble depicted in FIG. 2 can be exemplarily applied for performing electronic payments using the inventive concept. A person who wants to buy something possesses an inventive, mobile electronic purse data carrier 40 which is used in the context described next as a debitor carrier.

The debitor carrier 40 is depicted twice in the drawing, first, in the bottom left corner in order to illustrate the internal structure thereof and second in the top right corner for demonstrating the way of operating it. The debitor carrier 40 comprises a Chipcard having some processor means 42 and some storage means 44 interconnected. A respective program is stored in the storage and can be executed by the processor for cooperating with the transaction device 21 and a creditor carrier 27 in order to perform a monetary transaction according to the present invention. In order to illustrate its function the mobile carrier 40 is depicted to be able to be inserted into a slot 24 of the transaction device 21. The transaction device 21 further comprises a processor means 25 connectable to I/O-terminals to the mobile carrier 40 and connected to an internal storage 31, as well as to an enter unit 22 and a display unit 23. Further, the processor 25 is connected to a connective interface 26 which connects to the creditor carrier 27. On the creditor carrier 27 basically the same structure is provided as in the mobile one, namely, a processor means 28 as well as a storage means 29. In this particular example the creditor carrier is, however, a stationary unit for example a personal computer somewhere in the shop in which the person having the mobile carrier wants to buy something. Being implemented as such a backend system the creditor device 27 may be dimensioned larger in respect to storage sizes compared to the debitor carrier 40 which is considered as a mobile and small device.

Figure 3A:
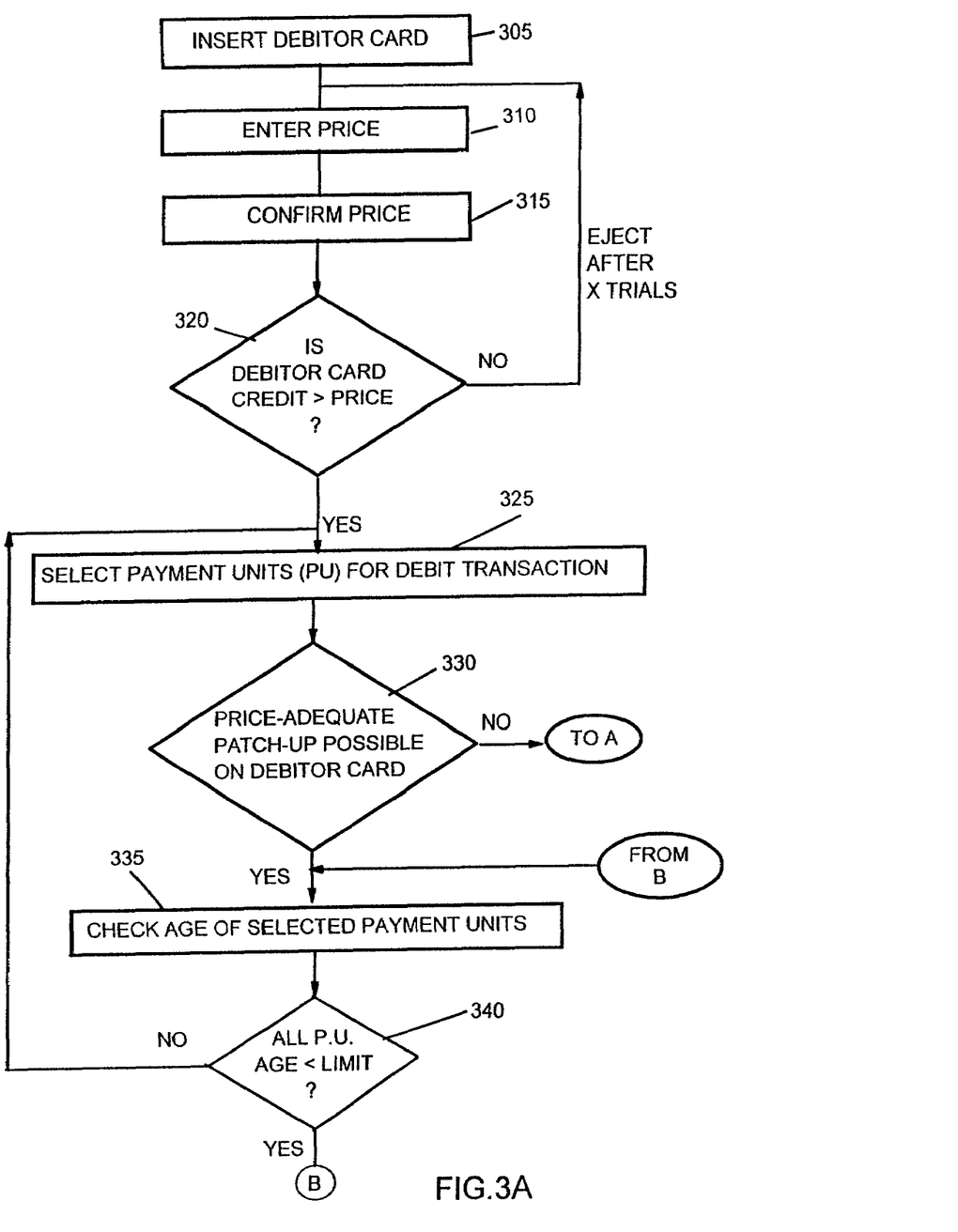

The transaction device 21 as well as the mobile carrier 40 store programs which when loaded and executed perform the programmed steps forming part of a transaction process which will be described next in more detail and with reference to FIGS. 3A, 3B and 3C.

The client having the mobile debitor carrier 40 wants to buy some product having a price of 10 Euro, 30 Cents in the above mentioned shop. Thus, in a first step 305 he enters his purse data carrier 40 into the slot 24 of the shop's transaction device 21, see back to FIG. 2.

In a next step 310 the vendor of the shop enters the price of the product into the transaction device. In order to do this, the vendor can type it in via the enter unit 22 which might be provided with respective keys, or, alternatively via any kind of prior art reading device, for example a barcode reader.

Then, the client confirms the price, step 315. Then a check of whether the debitor card has stored a credit which is larger than the price mentioned above leads to a decision 320. In case the debitor card has not enough credit, it is branched back to step 310 in order to process a product having a smaller price, or, alternatively the card is ejected from the transaction device.

In the yes-branch the transaction is continued. Thus, in a next step 325 some number of payment units (PU) are selected on the debitor card, i.e. in the storage area 44 of it, for performing the debit transaction. In order to do that it is checked by the program loaded in the mobile carrier if a price-adequate patch-up is possible on the debitor card. This is possible when, for example on the debitor card there exists one payment unit having a monetary value of 10 Euro and if at least three payment units exist each having a monetary value of 10 Cents. Thus, in total those payment units would add to yield a total of 10 Euro 30 which corresponds to the price of the product.

A further different patch-up would be when for example two payment units each having a monetary value of 5 Euro would be present instead of or in addition to the above mentioned 10 Euro payment unit. Thus, a decision 330 is taken. In the yes-branch of it, according to the present embodiment, respective payment units are selected and the age information of each selected payment unit is checked to determine whether it has exceeded a predetermined transaction age threshold level. Said threshold level is defined in this case by a number of 50, common for all payment units independent of their individual monetary value. Thus, the transaction count field 16 depicted in FIG. 1 is checked for each selected payment unit to determine whether the value stored therein is smaller than said limit value of 50. This leads to a decision 340. If said criterion is not satisfied for one or more payment units, see the no-branch of decision 340, it is branched back to step 325 in order to try to select different payment units for the intended transaction.

Optionally, the selection process performed in step 325 may include some prespecified algorithm which selects such payment units stored on the carrier which have small values of transaction counts in order to avoid too many iteration steps between decision 340 and step 325.

Figure 3B:
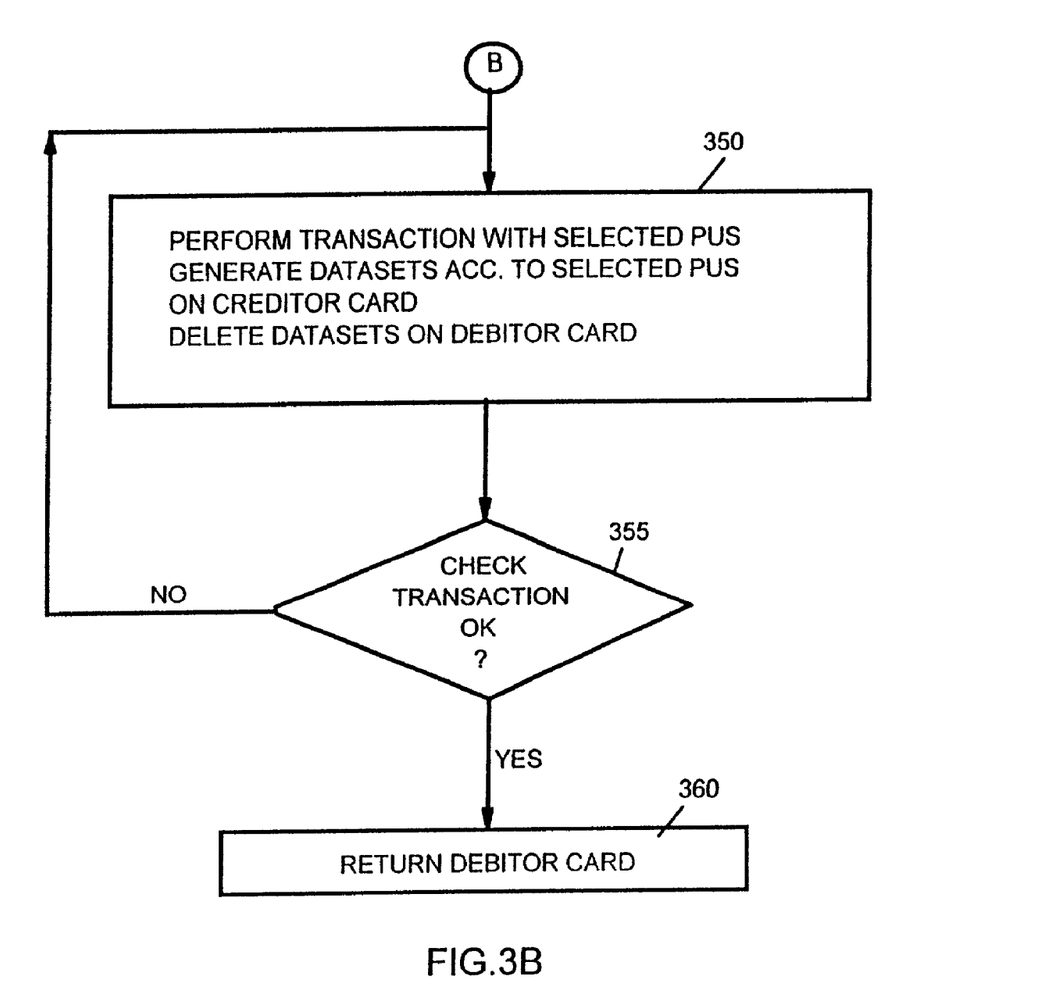
Figure 3C:
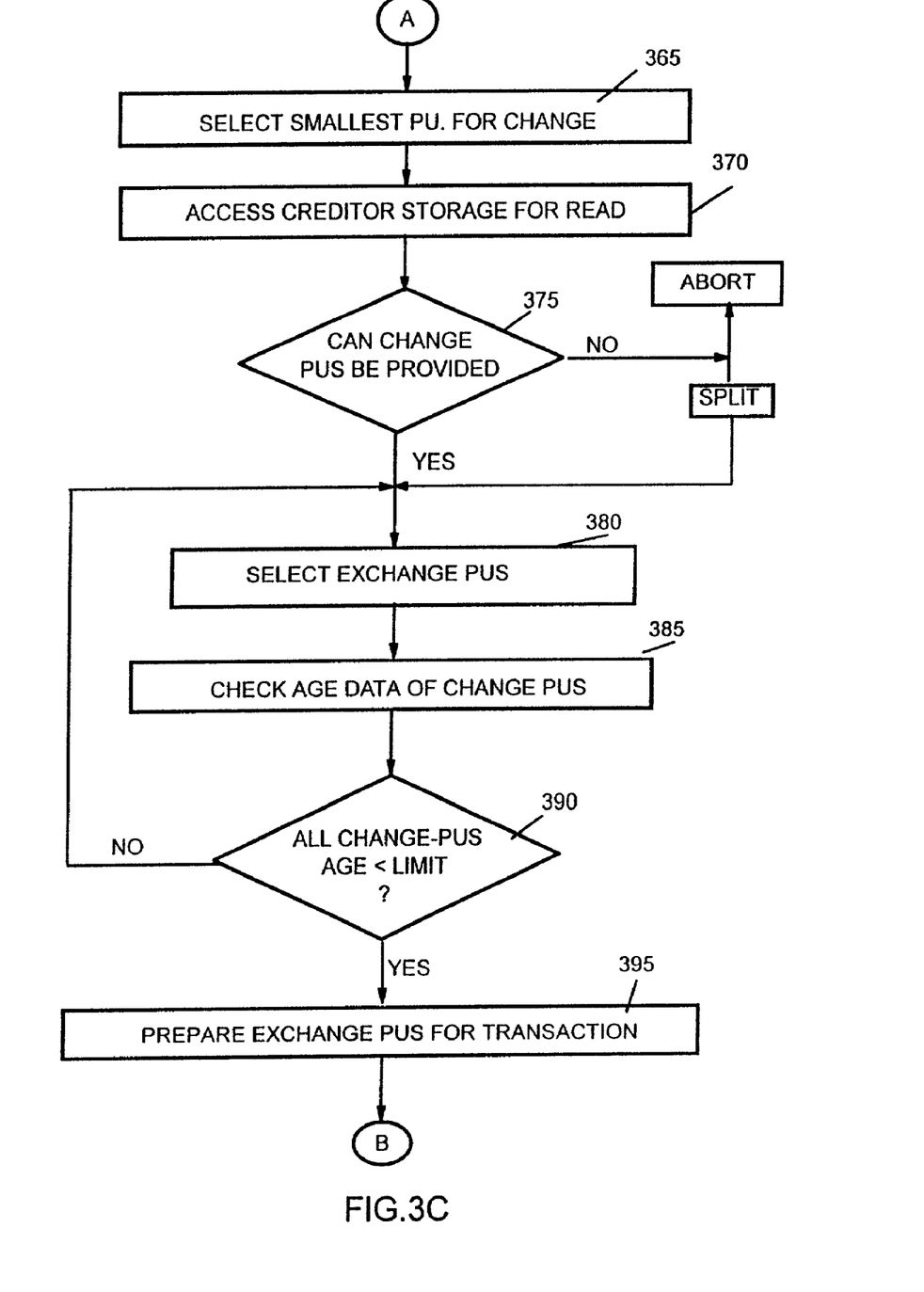

In the yes-branch of decision 340, see the continuation on FIG. 3B, the actual transaction is performed at transaction 350. Said transaction generates datasets on the creditor card 27 which exactly correspond to the selected payment unit datasets of the debitor card 40. In particular, the selected datasets from the debitor card 40 are copied from the debitor card to the creditor card and the value in the transaction count field 16 is increased by 1. In particular the value stored in the valid field 20 remains 'valid' i.e., is stored such that it indicates that a respective payment unit is present on the carrier having the respective monetary value. On the debitor card, however, the selected payment units are 'deleted' by setting the value in the valid field 20 to 'invalid'. By this measure the respective payment units on the debitor card are marked as 'spent' and can thus not be involved in a later transaction for buying something else. Thus, an illegal copy or a multiple use of the same payment unit in series on the same carrier is avoided.

Then, in step 355 the steps performed in block 350 are checked again in order to prove the correctness of them. In the no-branch of a respective decision 355, when some error was detected, the steps 350 are repeated again processing the same payment units again. If the same error or a different error recurs more than, for example, three times, the transaction is aborted and all steps are rolled back in order to re-establish the initial state of the creditor carrier and debitor carrier. When the transaction is successful, see the yes-branch of 355, the debitor card is returned to the client by ejecting it from the slot, step 360.

With reference back to FIG. 3A, when a price adequate patch-up is not possible on the debitor card, see the NO-branch of step 330, an attempt will be undertaken to perform a change process in conjunction with payment units stored on the creditor carrier 27. A respective sequence of steps is depicted in FIG. 3C, ending at the reference symbol 'B'. For illustrating this additional optional feature it should be assumed that the product price is again 10 Euro, 30 Cents. On the debitor card, however, the following valid payment units are present only: one payment unit of value 20 Euro, one unit of value 50 Euro, and one payment unit of the monetary value of 100 Euro.

Thus, in a first step 365 advantageously the payment unit having the smallest monetary value, i.e. the 20 Euro payment unit is selected as a base for the following change process.

Thus, in a step 370 the creditor storage is accessed for a read process. In this read process it is determined whether a change might be provided to the debitor card. In particular, the difference between 20 Euro and the product price 10 Euro, 30 Cents is calculated, yielding a change amount of 9 Euro 70. Thus, it is determined whether the storage 29 of the creditor carrier 27 comprises any payment unit patch-up giving the above mentioned change amount.

In case decision 375 yields that respective change payment units can be provided to the debitor card, see the yes-branch thereof, the before-mentioned 20 Euro payment unit stored on the debitor card is selected for transaction, as well as the respective change payment units just selected on the creditor card. For sake of completeness said change payment units are assumed to be 9 payment units having a monetary value of 1 Euro, and 7 payment units having a monetary value of 0.1 Euro. Said selection step is depicted with reference sign 380. Then, the selected payment units are checked regarding their age information as it was described above, step 385. When one or more change payment units have exceeded their limit, see the no-branch of decision 390, it is branched back to step 380 in order to select different ones. In the yes-branch of decision 390 the change payment units are prepared for transaction, step 395, in order to involve them in a respective transaction according to the before mentioned transaction block 350, see back to FIG. 3B.

The NO-branch of decision 375, a splitting process or an abort of the transaction can be considered.

It should be noted that the above-described change process can be extended as well by one or more iteration loops which are used for seeking a possibility to realize a change process, for example by involving some more payment units of small monetary value present on the debitor card 40, as one would do with physical coins in a physical purse.

It should be noted that the trading transaction process is not necessarily limited to involve devices as they are depicted in FIG. 2, i.e., to comprise a stationary backend system. Instead, two mobile electronic purse data carriers can be inserted into a respective transaction device and the payment units might be copied from the debitor to the creditor card in the above-described way.

A banking terminal device can be visited by a person having a mobile purse data carrier in order to reset the transaction count of the payment units stored therein. In the sample implementation depicted in FIG. 1 the value stored in the cycle field 14 will then be increased by one indicating that the respective payment unit was reset one more time. Optionally, said resetting procedure can be done with all payment units present on the card in order to increase the comfort to the client. Alternatively, only those payment units might be able to be reset that have reached a transaction count of, for example 80% of the maximum value, which was exemplarily defined above with a value of 50.

Thus, the bank which receives the information during such a resetting procedure and which maintains a relational database with a table in which the PU-ID is managed as an index field has a control over the payment units actually in use. If, otherwise, a client does not come back to a banking terminal in order to perform a reset procedure the payment units can not be used for buying anything. Of course, a client can be informed about the obligation to visit a banking terminal for reset purposes in due time before said limit level has been reached.

Basically, the storage administration for the inventive electronic purse data carriers should be adapted to the respective current or future technology of SmartCards, as mobile carriers are concerned.

Nevertheless, a prior art static or a dynamic storage administration can be used for the inventive purposes.

In the static storage administration a client can get a new, i.e., unused purse having an initial ensemble of valid payment units as follows: for example ten having a monetary value of 50 Euro, a further ten having a monetary value of 10 Euro, a further twenty PUs having a monetary value of 5 Euro and twenty PUs having a value of 2 Euro, ten payment units of 1 Euro, ten payment units of 10 Cents, and finally twenty payment units of 1 Cent.

When he acquires such a new electronic purse his current account will be debited accordingly. The banking authority then stores the thus issued payment units and the respective payment unit Ids in the database. In the static storage model preferably a large number of free storage locations is provided each of which can receive a new payment unit by copying the respective data of datasets, as described in FIG. 1 into those storage locations.

In the dynamic storage model the datasets are generated dynamically according to the requirements of a respective transaction process.

Further, the age information may comprise more than the before-mentioned transaction count. For example it can comprise the date, and/or time when a respective payment unit was initially issued by the banking authority. Of course, such a date might replace said transaction count, as well. With this measure, payment unit use can be controlled in the above sense just by comparing said initial issue date with the current date.

Further, according to an additional aspect of the present invention basically in both storage administration models mentioned above two additional features might be incorporated in order to facilitate the change process and thus in order to increase the comfort provided to the client. Said additional features essentially comprise the ability to split up a payment unit into a plurality of payment units, and correspondingly to join a plurality of payment units into one payment unit.

In particular and using a parent-child terminology for splitting and a single/joint terminology for joining, said features comprise the ability to perform the following steps during an above mentioned change process. A parent payment unit having a given non-minimum parent monetary value is split into a plurality of child payment units each having a child monetary value smaller than the parent value, whereby the sum of children monetary values is the same as the parent monetary value, and transferring the respective age information, i.e., initial issue date, transaction count, etc. from said parent unit to the plurality of child payment units. For the joining process a plurality of single payment units, for example seven PUs of 1 EUR and thirty PUs of 10 Cents (1 Cent=0.1 EUR) having a given total monetary value of 10 EUR are joined into a joined payment unit of 10 EUR having indeed the corresponding same monetary value. Further, advantageously, resulting age information is generated for said joined payment unit according to a predetermined rule, for example to select and inherit the oldest age information of the single PUs to the joined PU. Other rules can be set-up, as well. Further, for improving storage efficiency on the purse—which might be relevant for example in multi-application chipcards—a patching pattern for splitting and/or joining payment units can be established according to the current prevailing storage requirements present on the purse.

If for example there is little storage space left, joined payment units might be generated without being limited to a predetermined schedule of values, like for example: 1 cent, 10 Cent, 1, 2, 5, 10, 20, 50, 100, 500, 1000 EUR. Instead, for example, a joined payment unit of 8 EUR could be joined from three 1 EUR and fifty 10 Cent Payment units. In such a flexible join it is recommended to exclude payment units from the age level control when they have a monetary value below a predetermined value, for example below 1 EUR.

Further, a payment unit might be advantageously excluded from an intended split or join process if said payment unit has exceeded a predetermined change threshold age level, of e.g., 90% of the transaction control level. By this measure some contribution can be provided to obtain a compromise between official control, security and user comfort. Further, the situation is avoided in which a person's freshly reset purse is loaded up with payment units soon to be reset as their age information is going to expire.

The present invention can be realized in hardware, software, or a combination of hardware and software. A payment managing tool according to the present invention can be realized in a centralized fashion in one computer system, or in a distributed fashion where different elements are spread across several interconnected computer systems, mobile or stationary. Any kind of computer system or other apparatus adapted for carrying out the methods described herein is suitable. A typical combination of hardware and software could be a chipcard with a computer program that, when being loaded and executed, controls the computer system, for example the trading device, the banking terminal device, etc., or a second chipcard such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following: a) conversion to another language, code or notation; b) reproduction in a different material form.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, in a situation in which a first mobile purse data carrier is used as a creditor card and a second mobile purse data carrier is used as a debitor card, and no more storage is present for receiving payment units (credit), then particular datasets can be overwritten by new datasets when their Valid-field 20 value is 'invalid'.

The invention claimed is:

1. An electronic purse data carrier for performing monetary transactions, comprising
    a storage means for storing one or more payment units each having a respective monetary value, each of said payment units comprising an age information valuable for delimiting the use of the payment unit, and each of said payment units having a respective unique payment unit-ID, in which said age information reflects the extent of transactional use of the respective payment unit, and in which said age information represents a date information;
    a processor for read and/or write access to said storage means, and means for updating said age information whenever a transaction has been performed with a respective payment unit;
    means for splitting a parent payment having given non-minimum parent non-minimum monetary value into a plurality of child payment units each having a child monetary value smaller than the parent value, the sum of child monetary values being the same as the parent monetary value, and means for transferring a respective age information from said parent unit to the plurality of child payment units, means for joining a plurality of single payment units having a given total monetary value into a joined payment unit having a corresponding same monetary value, and means generating a resulting age information for said joined payment unit according to a predetermined rule, said means for transferring a respective age information further excluding said one or more payment units having a monetary value smaller than a predetermined value from inheriting age information, said means for transferring a respective age information further excluding said one or more payment units that have exceeded a predetermined change threshold age level from a split or join process.

2. The carrier according to claim 1, further comprising means for generating a patching pattern for splitting and/or joining payment units according to storage requirements present on the carrier.

3. The carrier according to claim 1, further comprising means for excluding a payment unit from an intended split or join process if said payment unit has exceeded a predetermined change threshold age level.

4. The carrier according to claim 3 further comprising a plurality of payment units of different monetary value.

5. The carrier according to claim 1 further comprising means for storing personal Identification Data associated with one or more payment units.

6. A method for managing electronic payments with an electronic purse data carrier, comprising the steps of:
    checking by a processor for each transaction if the age information of a payment unit stored on a storage device being part of the transaction has exceeded a predetermined transaction age threshold level, and restricting the use of a payment unit with an exceeded transaction age threshold level;
    splitting by the processor a parent payment unit having a given non-minimum parent monetary value into a plurality of child payment units each having a child monetary value smaller than the parent value, the sum of child monetary values being the same as the parent monetary value, and transferring a respective age information from said parent unit to the plurality of child payment units, joining a plurality of single payment units having a given total monetary value into a joined payment unit having a corresponding same monetary value, and generating a resulting age information for said joined payment unit according to a predetermined rule, said step of transferring a respective age information further excluding said one or more payment units having a monetary value smaller than a predetermined value from inheriting age information, said step of transferring a respective age information further excluding said one or more payment units that have exceeded a predetermined change threshold age level from split or join process.

7. The method according to claim 6, comprising the steps of using an age counter mechanism for checking the age information of a payment unit, the counter mechanism being implemented by encrypting a target number x, by successively applying, i a total of m-times, a private key to a source key and the respective application result, said source i key representing the unused age information, said target number x being the result of applying, a total of n-times, a public key to said source key, on each payment transaction applying said public key on said age information yielding a respective current age data, and checking for each transaction if the age information of a payment unit being part of the transaction corresponds to the target number x.

8. The method according to claim 7, in which repetitive application of the public key to said source key, and the respective application results yields a monotone varying function with a transaction age threshold value corresponding to said target number x.

9. A computer program product stored on a computer usable medium comprising computer readable program means for causing a computer to manage electronic payments with an electronic purse data carrier, where the carrier stores age information corresponding to payment units stored thereon, the computer program product causing the computer to perform the steps of:
    checking by a processor for each transaction if age information of a payment unit stored on a storage device being part of the transaction has exceeded a predetermined transaction age threshold level, and restricting use of a payment unit with an exceeded transaction age threshold level:

splitting by the processor a parent payment unit having a given non-minimum parent monetary value into a plurality of child payment units each having a child monetary value smaller than the parent value, the sum of child monetary values being the same as the parent monetary value, and transferring a respective age information from said parent unit to the plurality of child payment units, joining a plurality of single payment units having a given total monetary value into a joined payment unit having a corresponding same monetary value, and generating a resulting age information for said joined payment unit according to a predetermined rule, said step of transferring a respective age information further excluding said one or more payment units having a monetary value smaller than a predetermined value from inheriting age information, said step of transferring a respective age information further excluding said one or more payment units that have exceeded a predetermined change threshold age level from a split or join process.

* * * * *